(12) United States Patent
Terao

(10) Patent No.: US 8,264,745 B2
(45) Date of Patent: Sep. 11, 2012

(54) IMAGE PROCESSING APPARATUS, IMAGE PROCESSING METHOD, AND STORAGE MEDIUM

(75) Inventor: Yoshihide Terao, Yokohama (JP)

(73) Assignee: Canon Kabushiki Kaisha (JP)

( * ) Notice: Subject to any disclaimer, the term of this patent is extended or adjusted under 35 U.S.C. 154(b) by 547 days.

(21) Appl. No.: 12/512,683

(22) Filed: Jul. 30, 2009

(65) Prior Publication Data

US 2010/0033771 A1    Feb. 11, 2010

(30) Foreign Application Priority Data

Aug. 7, 2008   (JP) .................................. 2008-204573

(51) Int. Cl.
*H04N 1/04* (2006.01)
(52) U.S. Cl. ......... 358/448; 358/450; 358/444; 358/474
(58) Field of Classification Search .................. 358/448, 358/450, 444, 474
See application file for complete search history.

(56) References Cited

U.S. PATENT DOCUMENTS

2005/0206931 A1*   9/2005 Nakamura ..................... 358/1.9

FOREIGN PATENT DOCUMENTS

| JP | 2007-274404 A | | 10/2007 |
| JP | 2008-041045 | * | 2/2008 |

* cited by examiner

*Primary Examiner* — Houshang Safaipour
(74) *Attorney, Agent, or Firm* — Rossi, Kimms & McDowell LLP

(57) ABSTRACT

An image processing apparatus capable of preventing image processing from being performed on data for which an appropriate image processing cannot be carried out and improving the reliability of equipment signature. An MFP as the image processing apparatus reads an original, creates and stores electronic data, and stores electronic data created by an external unit. The electronic data created by the MFP is stored in association with MFP identification information. Electronic data created by the MFP among the stored electronic data is determined based on the MFP identification information. Execution of a function of the MFP on electronic data created by the external unit is restricted.

17 Claims, 16 Drawing Sheets

FIG. 5

| DOCUMENT ID | DOCUMENT ATTRIBUTE | DOCUMENT ATTRIBUTE VALUE |
|---|---|---|
| 10000 | DATE | 2007.12.1 |
| | FILE NAME | AAA.pdf |
| | ORIGIN | DEVICE |
| 10001 | DATE | 2007.12.10 |
| | FILE NAME | BBB.pdf |
| | ORIGIN | OTHER |
| 10002 | DATE | 2007.12.20 |
| | FILE NAME | CCC.pdf |
| | ORIGIN | DEVICE |

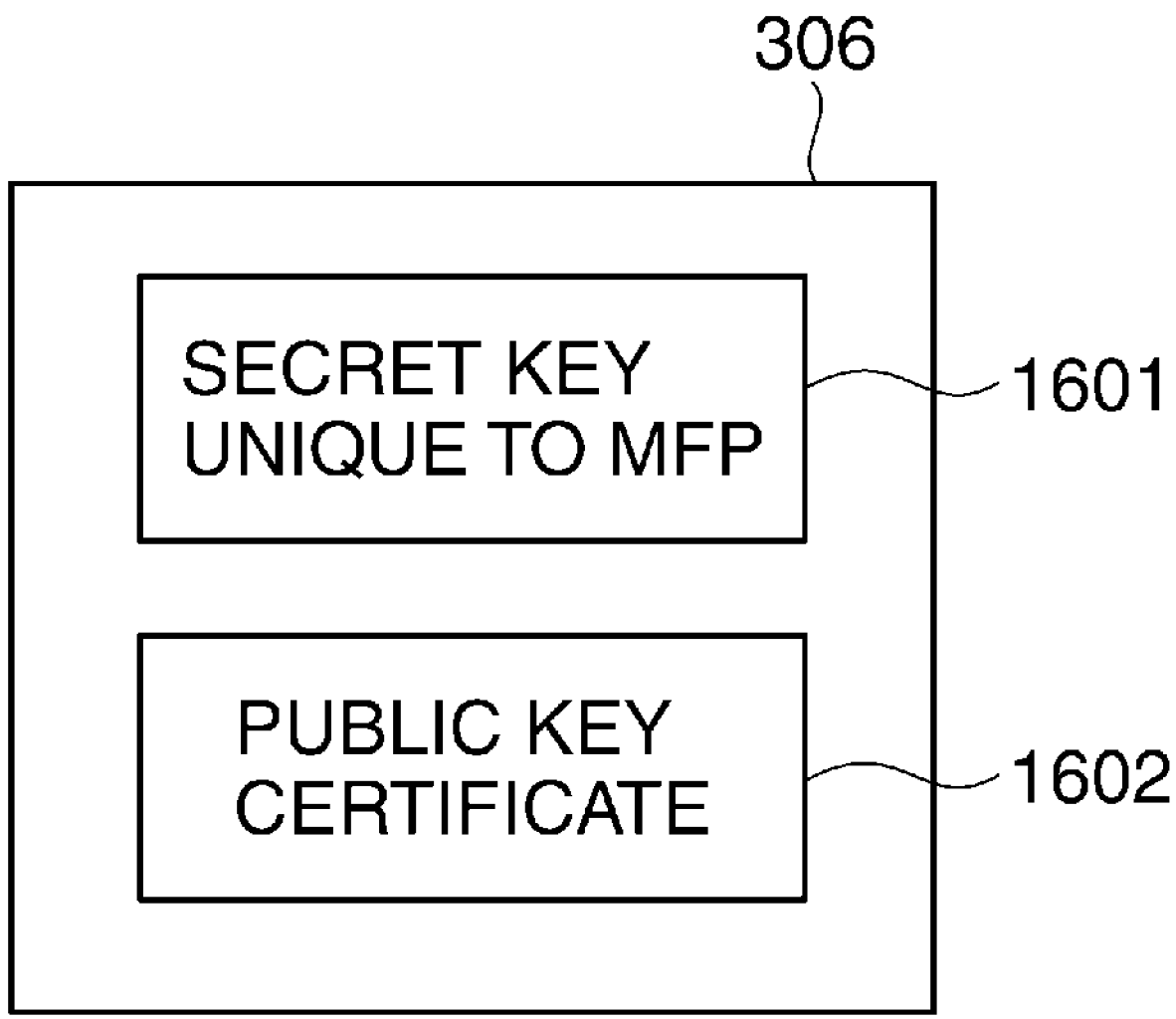

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium storing a program for executing the method, and more particularly, to an image processing apparatus having a storage unit in which electronic data created by an external unit are saved.

2. Description of the Related Art

An image processing apparatus such as a digital multifunction peripheral (MFP) is conventionally able to save print data or document data obtained by scanning documents into a storage unit thereof and convert the saved data into an arbitrary electronic format for transmission.

Also proposed is a technique in which data saved into a storage unit of an image processing apparatus is added with an electronic signature unique to the image processing apparatus (hereinafter referred to as equipment signature) and transmitted to the outside (see, for example, Japanese Laid-open Patent Publication No. 2007-274404). Equipment signature verifies that data has been created by the image processing apparatus.

Incidentally, if a storage unit of an image processing apparatus is made open via network to external personal computers or other external units, digitized data/electronic data (hereinafter collectively referred to as electronic data) created by external units are saved into the storage unit as well as print data and document data created by the image processing apparatus. When data created by the image processing apparatus and external units are mixedly saved into the storage unit of the image processing apparatus, the following problems are posed.

For example, if data created by some external unit and stored in the image processing apparatus is added with equipment signature and transmitted to the outside, the reliability of equipment signature (more generally, identification information) is lowered.

Most of data created by external units cannot be image-processed by the image processing apparatus. Therefore, even if the image processing apparatus accepts a request for image processing on data created by some external unit, it cannot perform image processing on that data in some cases.

SUMMARY OF THE INVENTION

The present invention provides an image processing apparatus capable of preventing execution of image processing on data unable to be appropriately image-processed and capable of improving the reliability of identification information representing the image processing apparatus.

According to a first aspect of this invention, there is provided an image processing apparatus having a creation unit adapted to read an original and create electronic data, which comprises a storage unit adapted to store electronic data created by the creation unit and electronic data created by an external unit, the storage unit being adapted to store electronic data created by the creation unit in association with identification information representing the image processing apparatus, a determination unit adapted to determine electronic data created by the creation unit based on the identification information among electronic data stored in the storage unit, and a restriction unit adapted, based on a result of determination by the determination unit, to restrict execution of a function of the image processing apparatus on electronic data created by the external unit among electronic data stored in the storage unit.

According to a second aspect of this invention, there is provided an image processing method for an image processing apparatus having a creation unit adapted to read an original and create electronic data, which comprises a storage step of storing electronic data created by the creation unit in a storage unit in association with identification information representing the image processing apparatus, the storage unit being adapted to store electronic data created by the creation unit and electronic data created by an external unit, a determination step of determining electronic data created by the creation unit based on the identification information among electronic data stored in the storage unit in the storage step, and a restriction step of restricting, based on a result in the determination step, execution of a function of the image processing apparatus on electronic data created by the external unit among electronic data stored in the storage unit in the storage step.

According to a third aspect of this invention, there is provided a computer-readable storage medium storing a program for causing a computer to execute the image processing method according to the second aspect of this invention.

With this invention, it is possible to prevent image processing from being performed on data which cannot appropriately be image-processed, and the reliability of identification information representing the image processing apparatus, e.g., an equipment signature, can be improved.

Further features of the present invention will become apparent from the following description of exemplary embodiments with reference to the attached drawings.

BRIEF DESCRIPTION OF THE DRAWINGS

FIG. 5 is a view showing an example of a document management table saved in a hard disk unit in step S404 in FIG. 4;

FIG. 16 is a view for explaining a secret key and a public key certificate saved in the hard disk unit of each of the MFPs in FIG. 3.

DETAILED DESCRIPTION OF THE PREFERRED EMBODIMENTS

The present invention will now be described in detail below with reference to the drawings showing preferred embodiments thereof.

First, a description is given of an information processing system having image processing apparatuses each according to a first embodiment of this invention.

Figure 1:
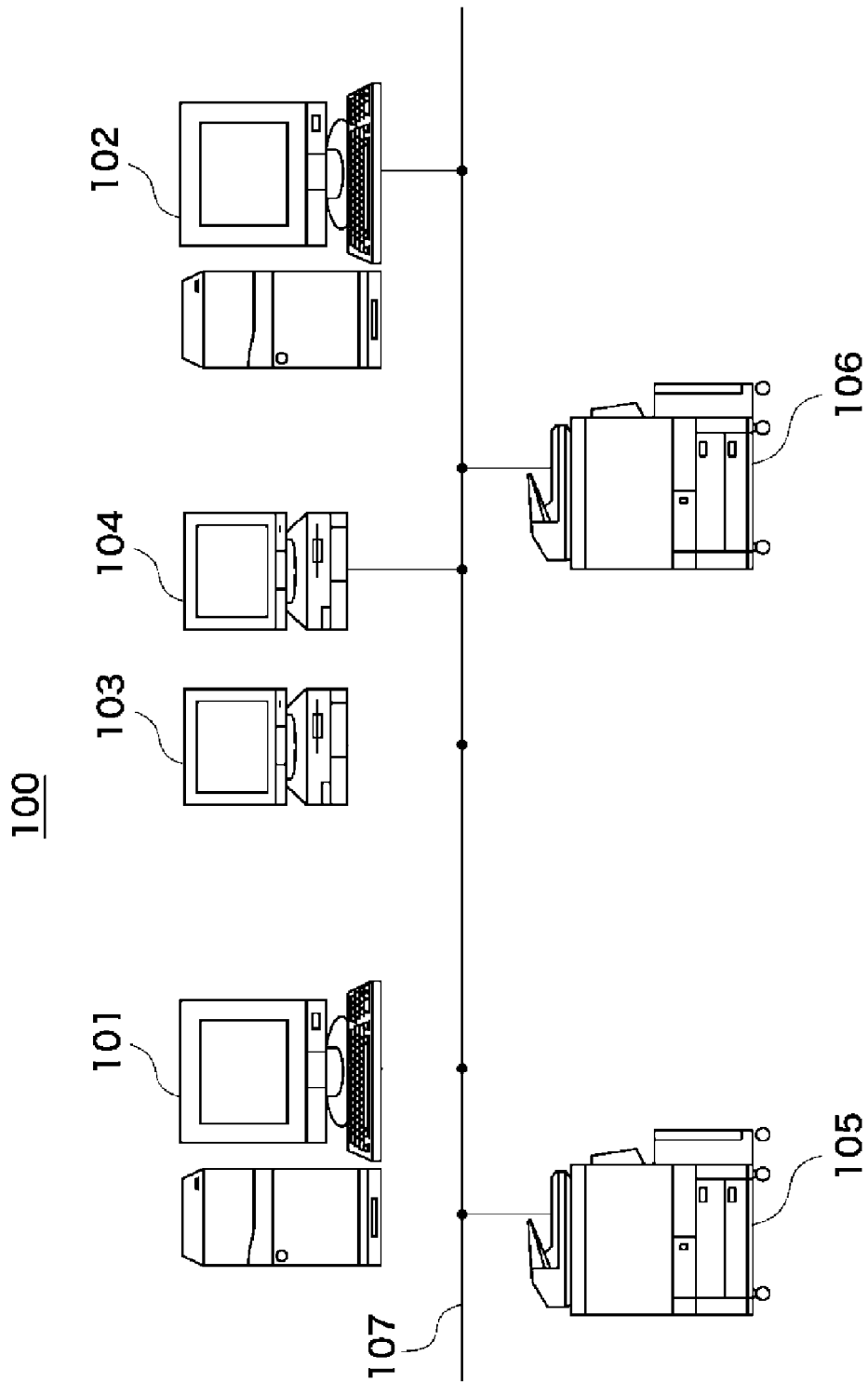
FIG. 1 is a view schematically showing the construction of an image processing system including image processing apparatuses (MFPS) each according to a first embodiment of this invention.

FIG. 1 schematically shows the construction of the information processing system.

Referring to FIG. 1, the information processing system 100 includes a mail server 101, an FTP server 102, client PCs 103, 104, and MFPs 105, 106 as image processing apparatuses. They are connected to a network 107 for communication with one another.

The mail server 101 has a function of transmitting an e-mail, transmitted from the client PC 103 or 104 or the like, to a transmission destination.

The FTP server 102 has a function of opening a folder on the server 102 via the network 107.

The client PCs 103, 104 are able to conduct FTP transmission of electronic data via the network 107 to a folder on the FTP server 102.

MFPs 105, 106 each have a function of copying a paper document and a function of converting image data of scanned document into an arbitrary file format and transmitting the resultant electronic data in the form of e-mail or transmitting it to a folder on the FTP server 102.

Figure 2:
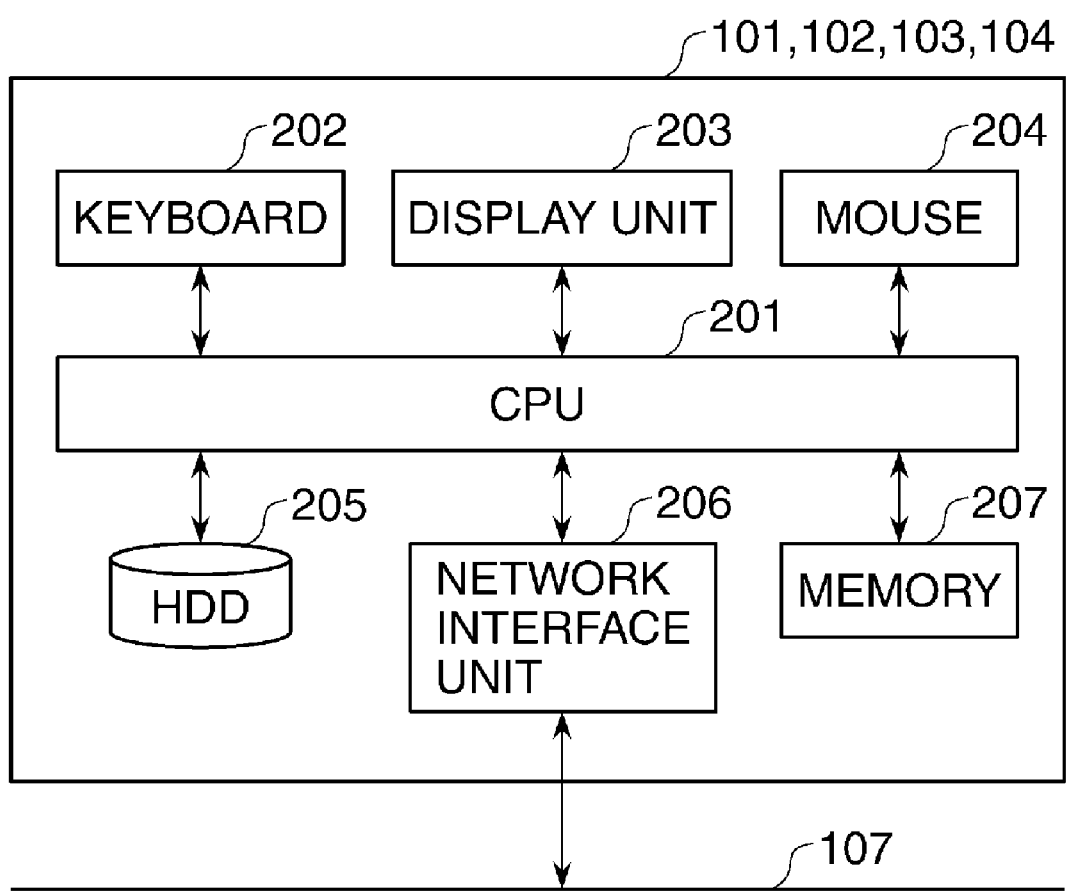
FIG. 2 is a block diagram showing the hardware construction of each of a mail server, FTP server, client PCs shown in FIG. 1.

FIG. 2 shows in block diagram the hardware construction of each of the mail server 101, FTP server 102, client PCs 103, 104.

Referring to FIG. 2, the apparatuses 101 to 104 each include an arithmetic processing unit (CPU) 201 for arithmetic processing, a keyboard 202 for use by a user for data input, a display unit 203 for display of a computer screen, a mouse 203 manipulated by the user, a hard disk unit (HDD) 205 for data storage, a network interface unit 206 for communication with the network 107, and a memory 207 for temporary data storage.

Figure 3:
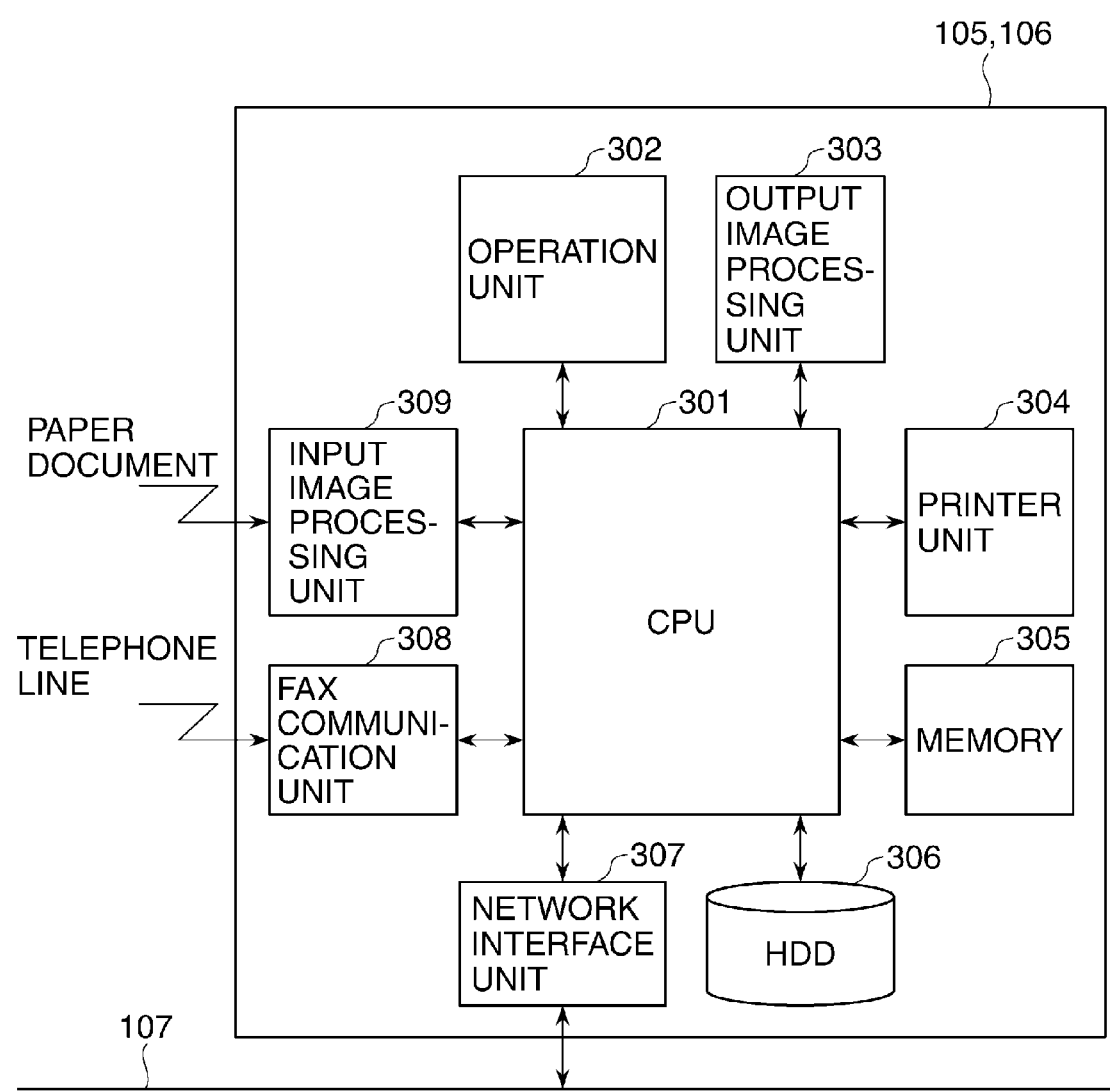
FIG. 3 is a block diagram showing the hardware construction of each of MFPs shown in FIG. 1.

FIG. 3 shows in block diagram the hardware construction of each of the MFPs 105, 106.

As shown in FIG. 3, the MFPs 105, 106 each include an arithmetic processing unit (CPU) 301 for arithmetic processing, an operation unit 302 for use by a user for manipulation of the MFP 105 or 106, an output image processing unit 303 for processing an input image, a printer unit 304 for outputting print data on a sheet of paper, a memory 305 for temporary data storage, a hard disk unit (HDD) 306 for storing (saving) electronic data, secret key, and public key certificate unique to device, etc., a network interface unit 307 for communication with the network 107, a FAX communication unit 308 for FAX transmission, and an input image processing unit 309 for scanning a paper document.

There are a variety of methods to input electronic data to the hard disk unit 306, such as a method for scanning a paper document by the input image processing unit 309 and inputting the resultant data into the unit 306, a method for transmitting and storing into the hard disk unit 306 electronic data created by the client PC 103 or 104 or the like via the network 107 and the network interface unit 307 using SMB or FTP or other file transfer protocol, and a method for transmitting and storing into the hard disk unit 306 electronic data created by the client PC 103 or 104 or the like via the network 107 and the unit 307 in the form of print data. It should be noted that the method to input electronic data into the hard disk unit 306 is not limited to the above methods.

Next, a data save process executed by each MFP, e.g., MFP 105, will be described.

Figure 4:
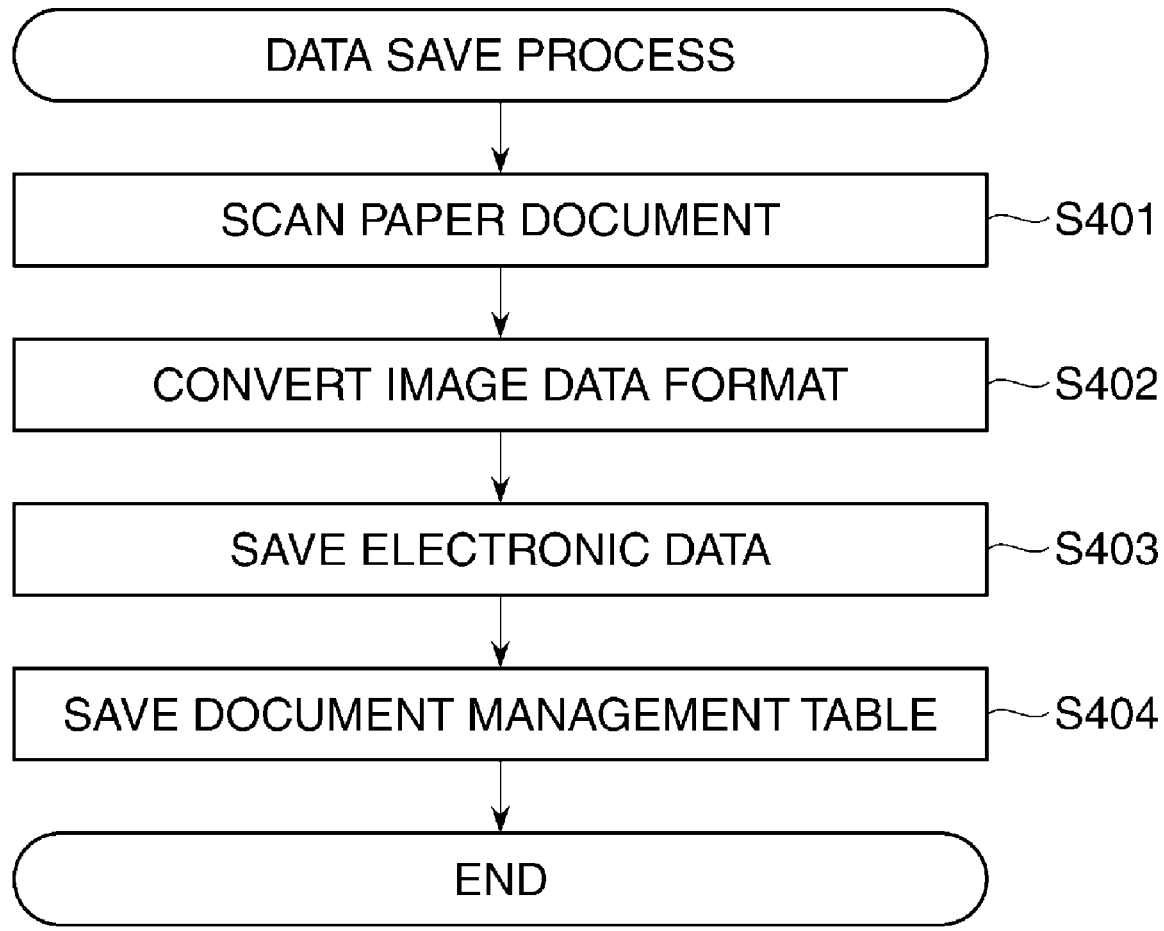
FIG. 4 is a flowchart showing a data save process executed by each of the MFPs.

FIG. 4 shows in flowchart the data save process executed by the MFP 105 to save image data of a document scanned by the input image processing unit 309.

In step S401 in FIG. 4, a paper document (original) is scanned by the unit 309 of the MFP 105. Then, image data of the scanned paper document is format-converted by the output image processing unit 303 into a file format (e.g., PDF or JPEG) specified by the user by manipulating the operation unit 302 (step S402), and the resultant electronic data is saved into the hard disk unit 306 (step S403). In step S404, a document management table shown in FIG. 5 is updated based on the electronic data and is saved into the hard disk unit 306 separately from the electronic data.

As shown in FIG. 5, the document management table includes document IDs each associated with a set of document attributes and document attribute values. Each set of document attributes consist of creation date, file name, and origin of document. The attribute value of creation date is described by, e.g., year, month and date, the attribute value of file name is described by, e.g., a file name with extension, and the attribute value of the origin of document is described by, e.g., a character string that specifies an apparatus that created the document.

The document scanned by the input image processing unit 309 in step S401 is guaranteed to have been created by the MFP 105, and therefore, the attribute value of the origin of document is described by, e.g., a character string "device" indicating that the document has been created by the MFP 105, i.e., indicating that the apparatus that created the document is the MFP 105. In a case where a plurality of MFPs (MFPs 105, 106 in this embodiment) are connected to the network 107, the attribute value of the origin of each document may be described by an identifier (e.g., "device 105" or "device 106") uniquely specifying the corresponding MFP.

On the other hand, in a case that electronic data created by the client PC 103 or 104 or the like is transmitted via the network 107 and saved into the hard disk unit 306, the MFP 105 carries out a data save process other than, but similar to, that shown in FIG. 4. As a result, a corresponding part of the document management table is created to update the table and the updated table is saved into the hard disk unit 306. In that case, the attribute value of the origin of document is described by, e.g., a character string "other" indicating that the document has been created by an apparatus other than the MFP 105, i.e., indicating that the apparatus that created the document is an apparatus other than MFP 105.

According to the above-described data save process, when electronic data is saved into the hard disk unit 306, a document ID, attribute, and attribute value corresponding to the electronic data are stored into the document management table. By referring to the document management table and on the basis of the document ID, attribute, and attribute value corresponding to the electronic data (especially, the attribute value of origin of document), the MFP 105 is able to determine whether each electronic data (document) has been created by its own device or by a device of another apparatus.

Next, a description is given of a data transmission process, which is executed by the MFP 105.

Figure 6:
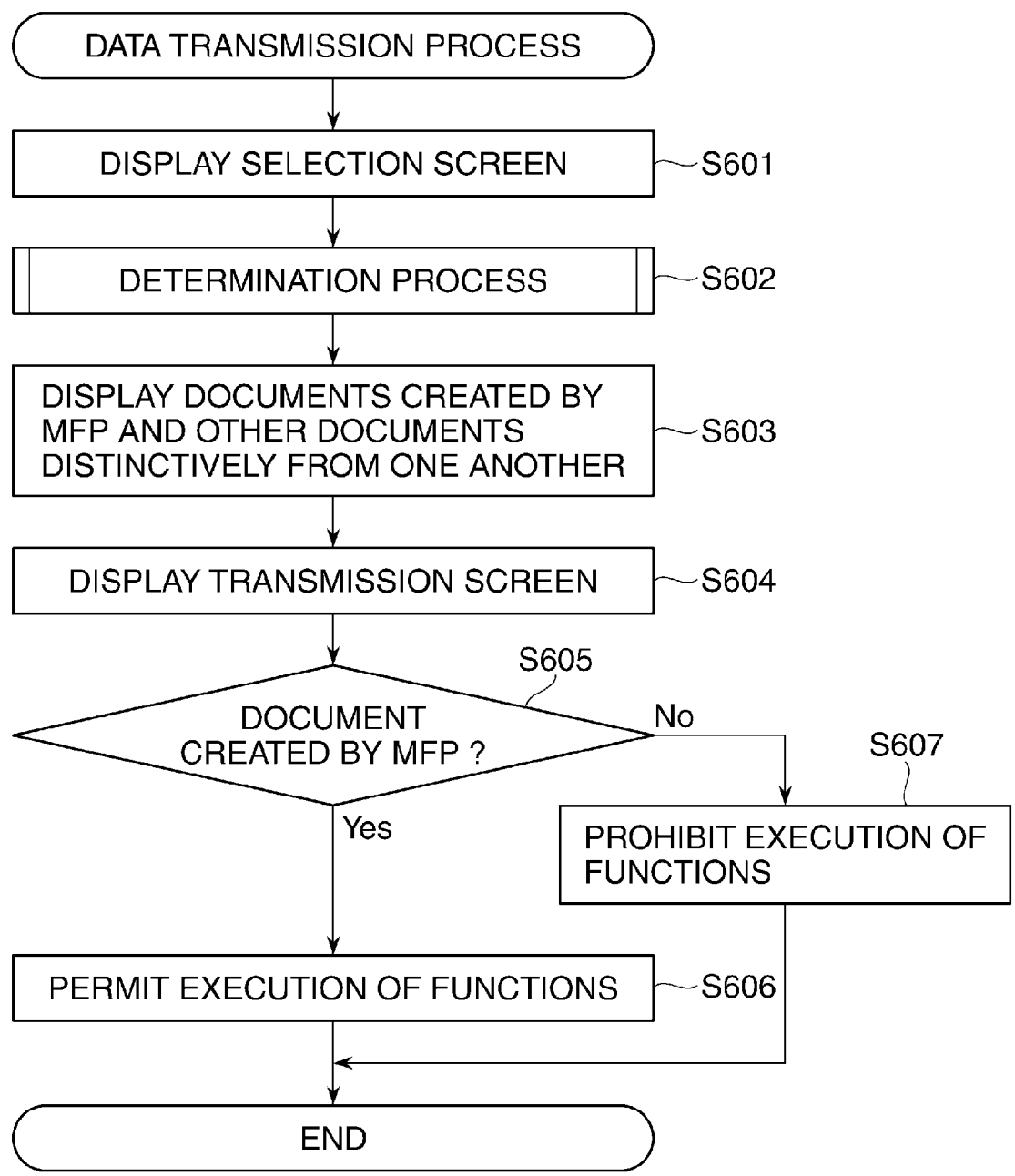
FIG. 6 is a flowchart showing a data transmission process carried out by each of the MFPs in FIG. 1.

FIG. 6 shows in flowchart the data transmission process executed by the MFP 105 to transmit electronic data of document selected by a user from among electronic data stored in the hard disk unit 306.

Figure 8:
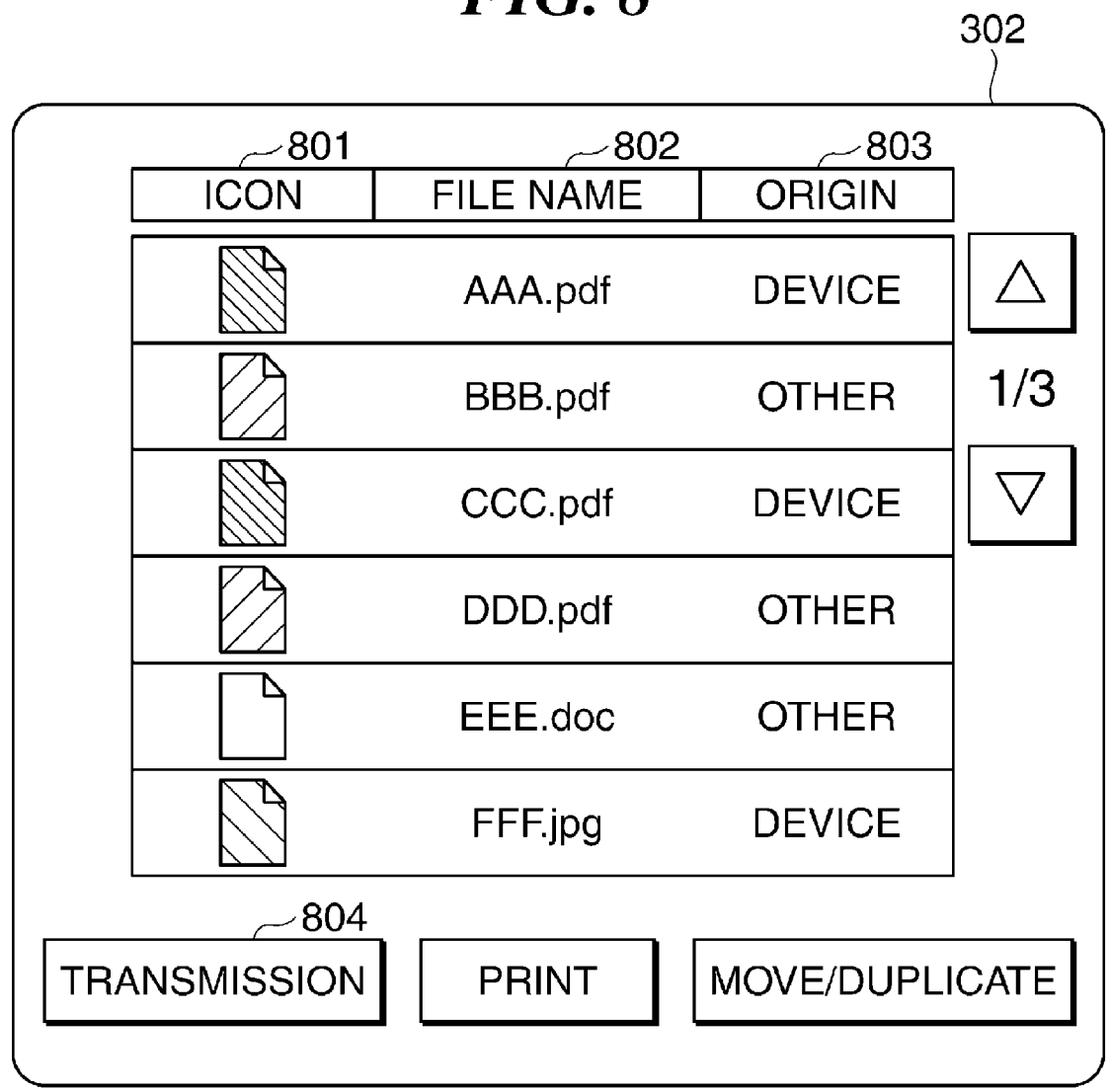
FIG. 8 is a view showing an example selection screen displayed on an operation unit of the MFP in step S601 in FIG. 6.

In step S601 in FIG. 6, the CPU 301 of the MFP 105 causes the operation unit 302 to display a selection screen shown in FIG. 8. The selection screen includes an icon area 801 in which icons that represent corresponding ones of the data saved in the hard disk unit 306 are indicated, a file name area 802 in which file names of the electronic data are indicated, and an origin area 803 in which origins of the electronic data are indicated. It should be noted that the display of documents on the selection screen can be scrolled by using roll up/down buttons on the right side of the screen and each icon in the icon area 801 can be indicated differently depending on whether the corresponding document was created by the MFP 105.

Next, a determination process in FIG. 7, described below, is carried out (step S602).

Figure 7:
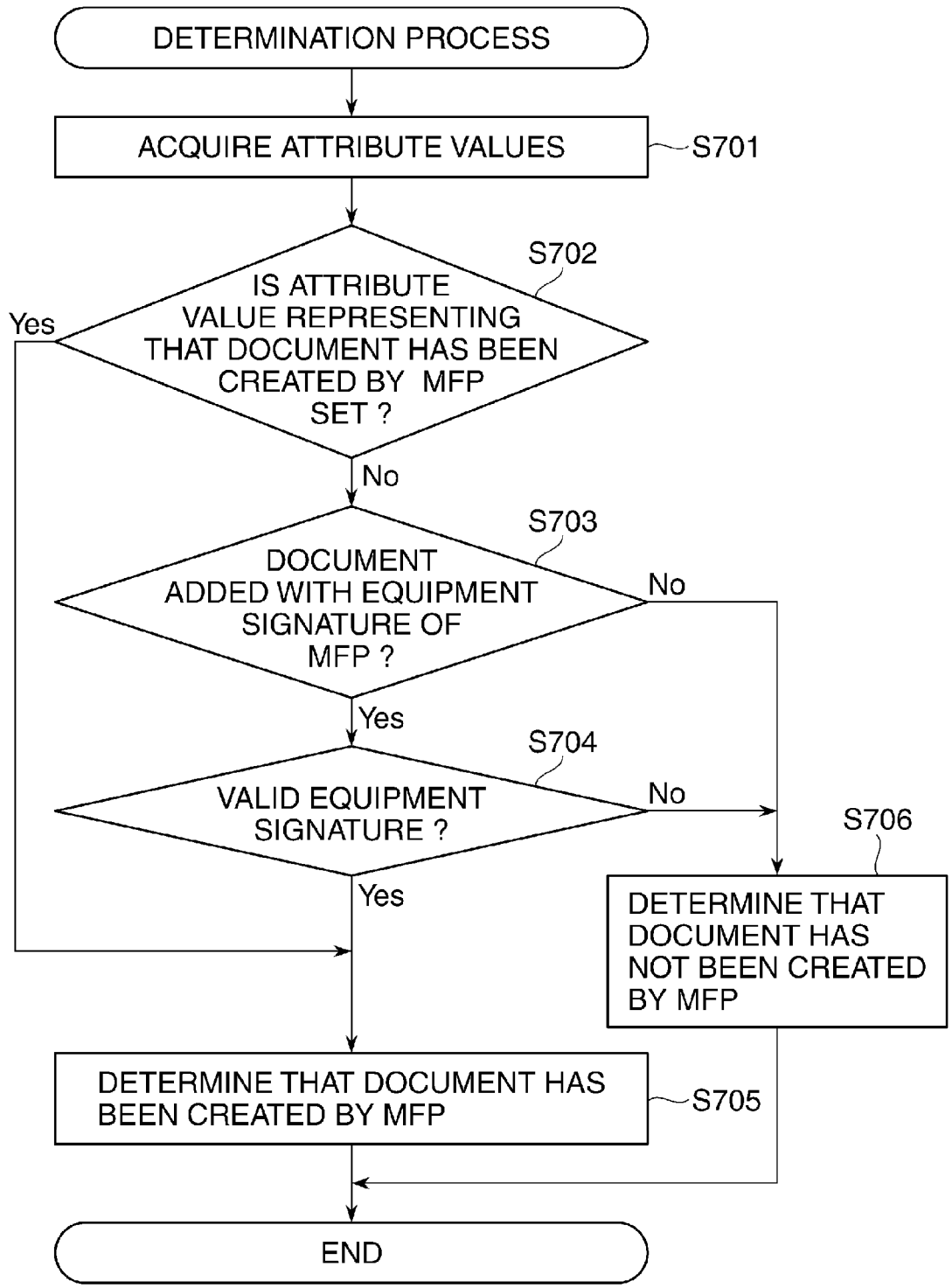
FIG. 7 is a flowchart showing a determination process carried out in step S602 in FIG. 6.

FIG. 7 shows in flowchart the determination process executed in step S602 in FIG. 6.

In step S701 in FIG. 7, the CPU 301 of the MFP 105 at least acquires attribute values of origins of documents indicated on the selection screen of FIG. 8 among the documents (electronic data) saved in the hard disk unit 306. Next, for each document indicated on the screen, the CPU 301 determines whether an attribute value representing that the document has been created by the MFP 105 is set (step S702).

For one or more documents, if any, for each of which it is determined in step S702 that an attribute value representing that the document has been created by the MFP 105 is not set, the CPU 301 determines whether the document is added with an equipment signature (identification information) of the MFP 105, i.e., whether the document is embedded with an equipment signature (step S703). It should be noted that the MFP 105 has an equipment signature function for adding an electronic signature to electronic data by utilizing a secret key 1601 unique to the MFP 105 and a public key certificate 1602, which are stored in the hard disk unit 306 of the MFP 105 as shown in FIG. 16.

For one or more documents, if any, for each of which it is determined in step S703 that the document is added with an equipment signature, the CPU 301 determines whether the equipment signature is valid (step S704).

Next, one or more documents, for each of which it is determined in step S702 that the attribute value representing that the document has been created by the MFP 105 is set or determined in step S704 that the equipment signature is valid, are determined to have been created by the MFP 105 (step S705), whereupon the determination process in FIG. 7 is completed.

On the other hand, one or more documents, for each of which it is determined in step S703 that the document is not added with an equipment signature or determined in step S704 that the equipment signature is not valid, are determined not to have been created by the MFP 105 (step S706), whereupon the determination process in FIG. 7 is completed.

Referring to FIG. 6 again, in step S603, the icons, file names and origins of documents are kept displayed on the selection screen in FIG. 8, but the icons and/or file names and/or origins of documents determined in step S602 (determination process in FIG. 7) to have been created by the MFP 105 and those of documents determined in step S602 to have been created by any apparatus other than the MFP 105 are displayed distinctively from one another. In the example in FIG. 8, the icons are displayed differently between documents created by the MFP 105 and documents created by other apparatuses.

Figure 9:
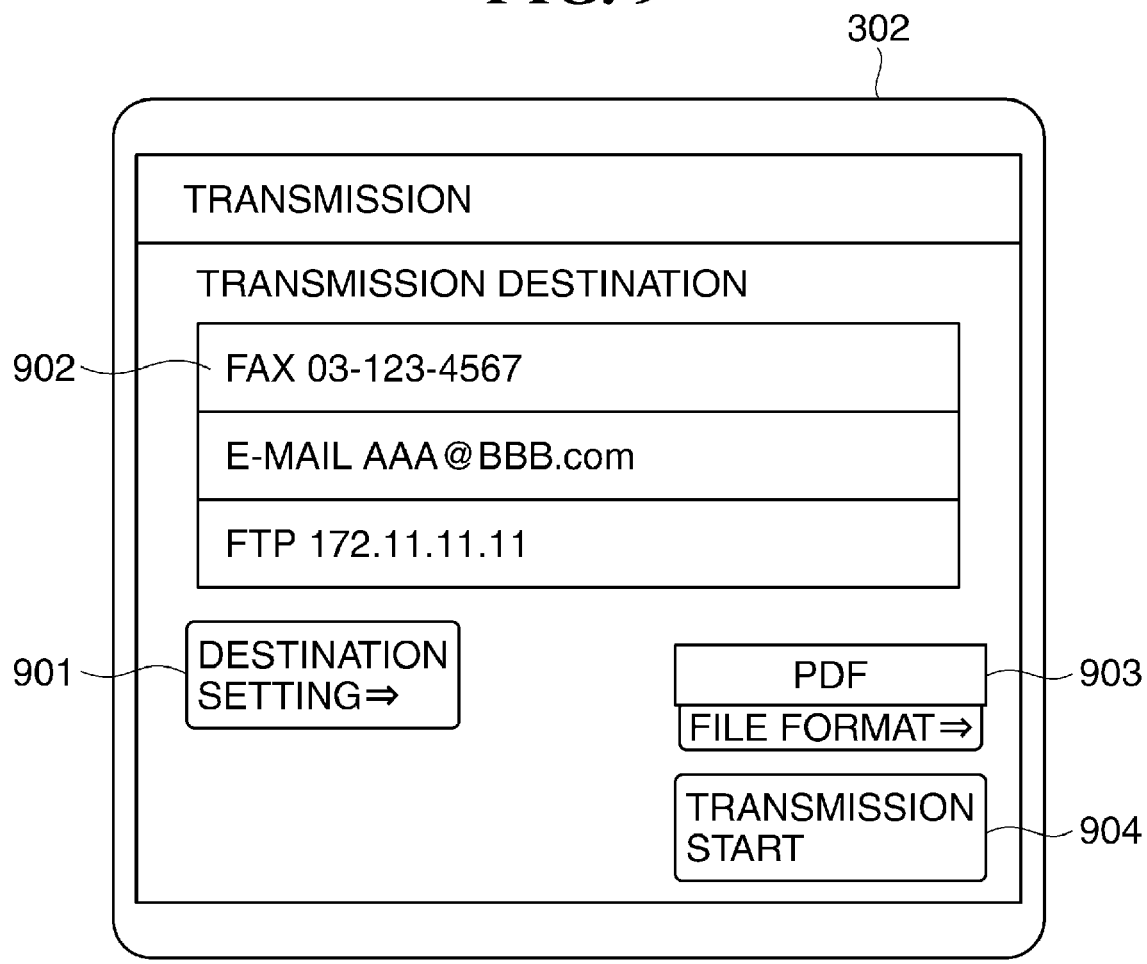
FIG. 9 is a view showing an example transmission screen displayed on the operation unit in step S604 in FIG. 6.
Figure 11:
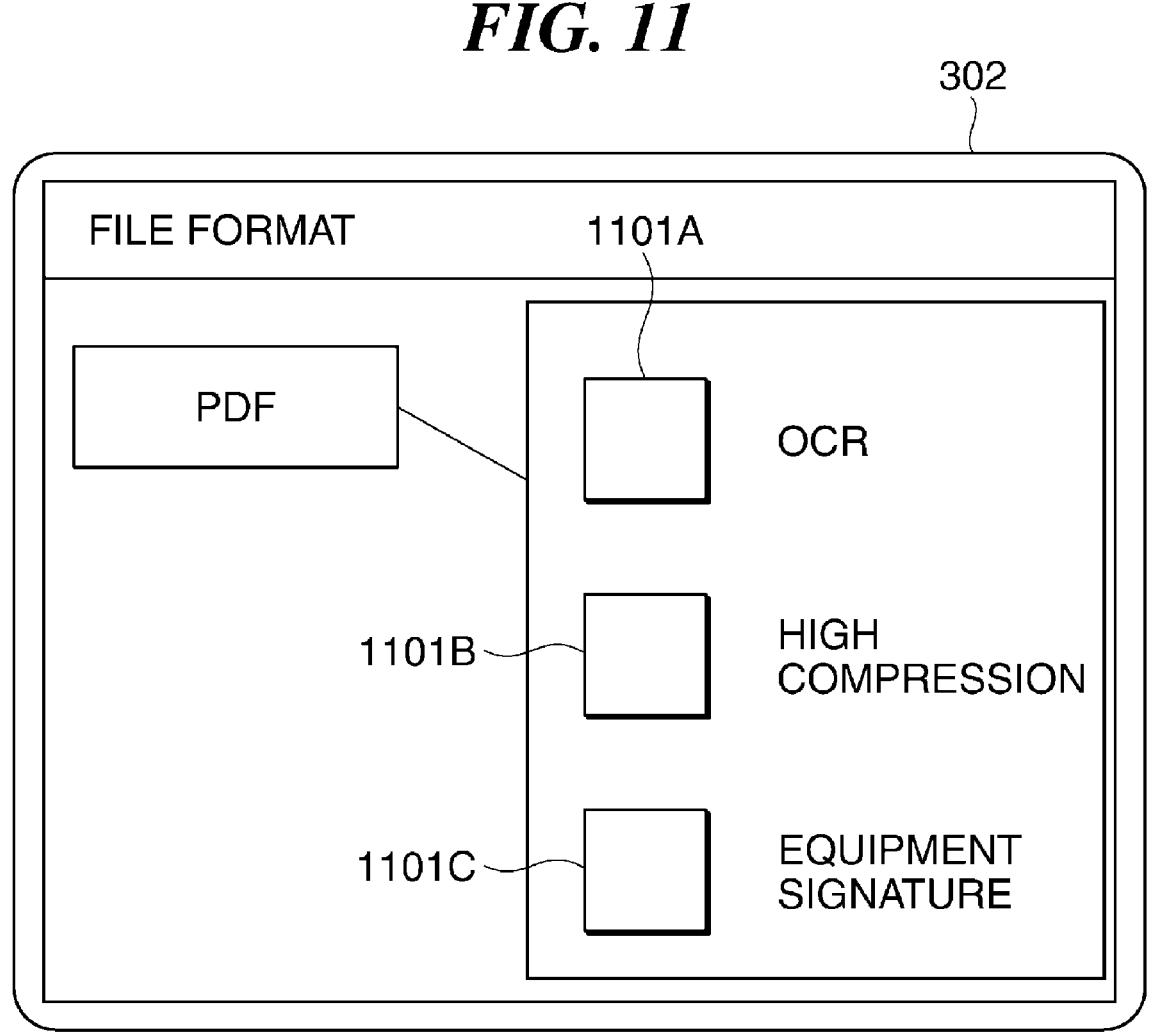
FIG. 11 is a view showing an example of a file format setting screen displayed on the operation unit when a file format setting button on the transmission screen in FIG. 9 is depressed.

When the user selects any of the documents indicated on the selection screen of FIG. 8 and depresses a transmission button 804, a transmission screen shown in FIG. 9 is displayed on the operation unit 302 (step S604). When a destination setting button 901 on the transmission screen is depressed, a destination setting screen (not shown) is displayed on the operation unit 302 to permit the user to select a desired transmission destination. The selected transmission destination is displayed on a transmission destination area 902 on the transmission screen. When a file format setting button 903 on the transmission screen is depressed, a file format setting screen shown in FIG. 11 is displayed on the operating unit 302 to enable the user to set a file format for use in transmitting the selected document.

Next, it is determined whether the document selected by the user is one created by the MFP 105 (step S605).

If it is determined in step S605 that the selected document is one created by the MFP 105 (YES to step S605), execution of a conversion function in which image processing such as character recognition (OCR) or high compression is executed and execution of an equipment signature function are permitted (step S606), whereupon the data transmission process of FIG. 6 is completed. It should be noted that the character recognition (OCR), high compression, and equipment signature function can each be selected by depressing a corresponding one of an OCR button 1101A, a high compression button 1101B, and an equipment signature button 1101C on the file format setting screen of FIG. 11.

On the other hand, if it is determined in step S605 that the selected document is one not created by the MFP 105 (NO to step S605), execution of the conversion function in which image processing such as character recognition or high compression is executed and execution of an equipment signature function are prohibited or restricted (step S607), whereupon the data transmission process of FIG. 6 is completed.

With the data transmission process in FIG. 6, execution of the conversion function requiring image processing is prohibited for a document not created by the MFP 105, i.e., for a document on which the MFP 105 is unable to carry out image processing. Therefore, it is possible to prevent image processing from being performed on a document on which image processing cannot appropriately be performed. In addition, execution of the equipment signature function is prohibited for a document not created by the MFP 105, and it is therefore possible to improve the reliability of equipment signature.

Figure 10:
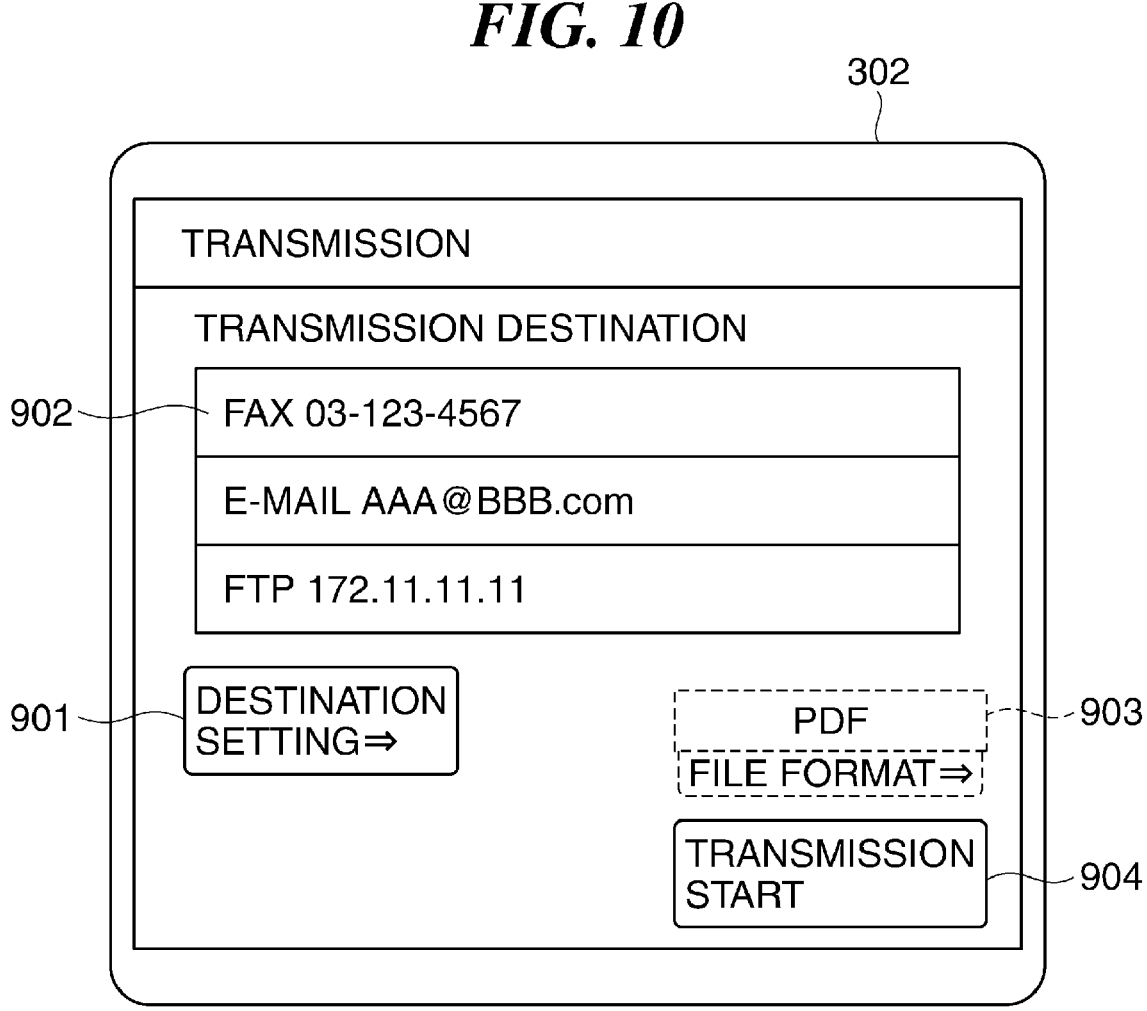
FIG. 10 is a view showing another example transmission screen displayed on the operation unit in step S604.

For the user-selected document determined in step S605 in the data transmission process of FIG. 6 that it has not been created by the MFP 105, the file format setting button 903 can be grayed-out as shown in FIG. 10 so as not to be selectable.

Next, a description will be given of an information processing system including image processing apparatuses each according to a second embodiment of this invention.

The information processing system of this embodiment is different from the first embodiment only in that execution/non-execution of enforced equipment signature can be set to the MFP 105 as image processing apparatus. Therefore, different construction and operation will only be described below, with a duplicated description of construction and operation thereof omitted.

In the case of MFP 105 for which execution of enforced equipment signature is set, an equipment signature is always added to a document created by the MFP 105 and transmitted via network or the like to the outside of MFP 105. It is therefore possible to correctly identify whether the document was created by the MFP 105, whereby security can be improved.

Next, a data transmission process executed by each MFP, e.g., MFP 105, of this embodiment will be described.

Figure 12:
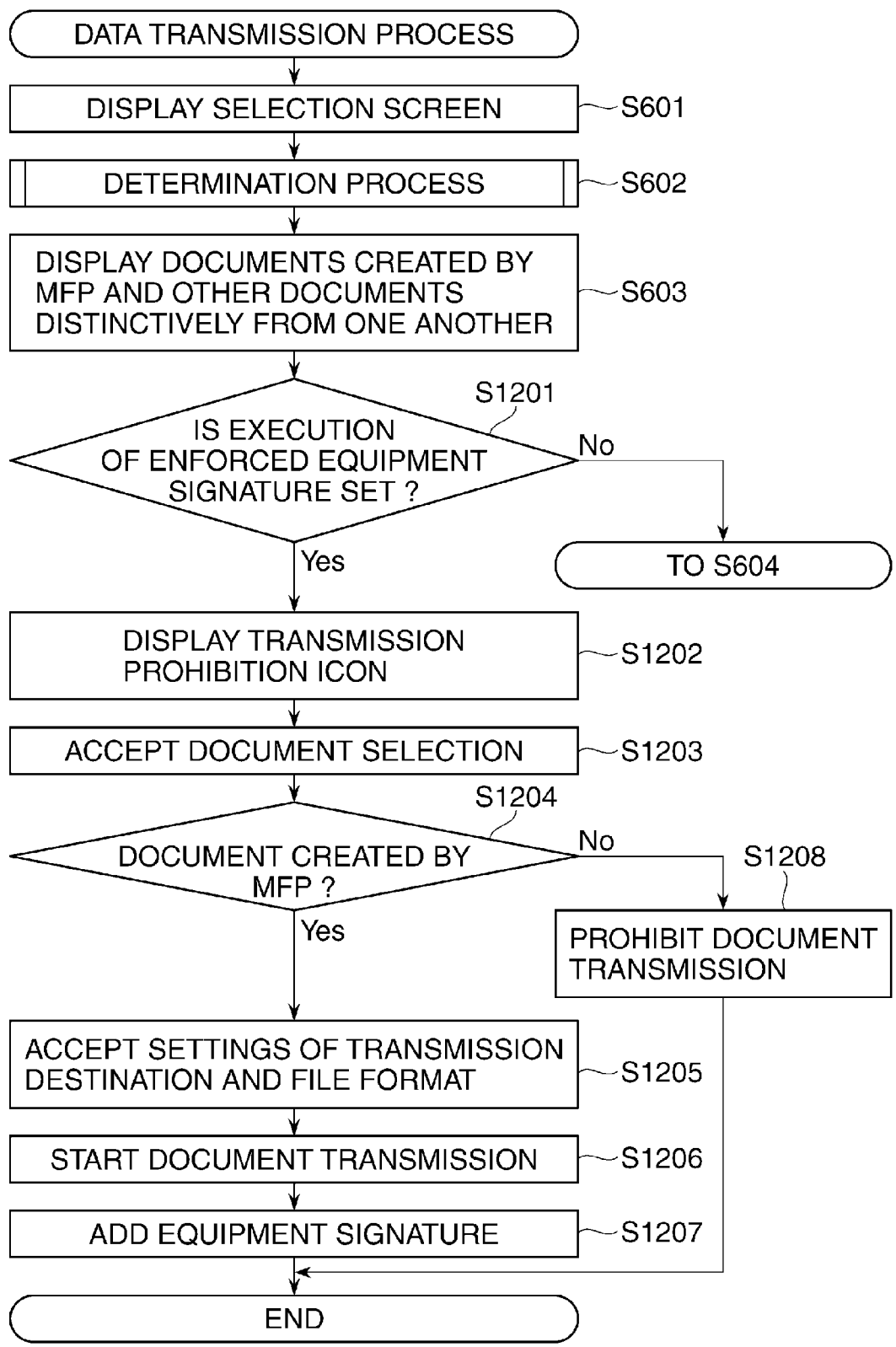
FIG. 12 is a flowchart showing a data transmission process executed by an MFP as an image processing apparatus according to a second embodiment of this invention.

FIG. 12 shows a flowchart of a data transmission process executed by the MFP 105. The process in FIG. 12 is basically the same as that shown in FIG. 6. The same steps as those shown in FIG. 6 are denoted by the same step numbers, and steps different from those of FIG. 6 will only be described, with a duplicated description omitted.

As shown in FIG. 12, the same processing as that of steps S601 to S603 in FIG. 6 is first carried out.

Next, the CPU 301 of the MFP 105 determines whether execution of enforced equipment signature is set to the MFP 105 (step S1201). If execution of enforced equipment signature is not set (NO to step S1201), the CPU 301 carries out the same processing as that of step S604 and subsequent steps in FIG. 6.

Figure 13:
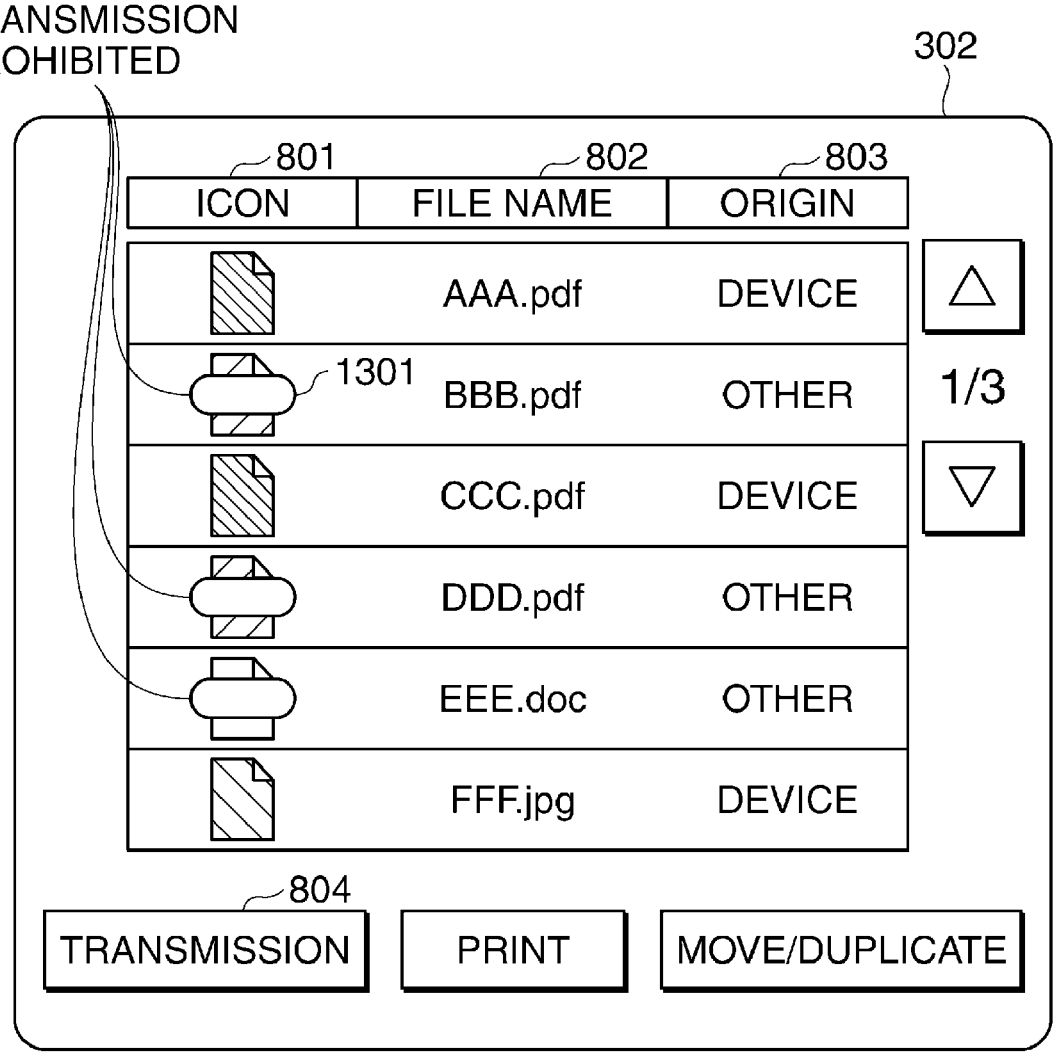
FIG. 13 is a view showing an example selection screen displayed on an operation unit of the MFP in step S1202 in FIG. 12.

If it is determined in step S1201 that execution of enforced equipment signature is set (YES to step S1201), a transmission prohibition icon 1301 is indicated, as shown in FIG. 13, in the icon area 801 on the selection screen for each of documents determined in step S602 not to have been created by the MFP 105 (step S1202). Namely, documents to which no equipment signature must be added at transmission are indicated distinctively from other documents, whereby security and user operability can be improved. In step S1202, instead of distinctively indicating documents to which no equipment signature must be added at transmission, such documents may not be indicated on the selection screen.

Next, the CPU 301 accepts a document selection by the user on the selection screen of FIG. 13 (step S1203).

Then, the CPU 301 determines whether the user's selected document is one that has been created by the MFP 105 (step S1204).

If it is determined in step S1204 that the selected document is one created by the MFP 105 (YES to step S1204), when the transmission button 804 on the selection screen of FIG. 13 is depressed, the transmission screen shown in FIG. 9 is displayed. Then, a transmission destination and file format set on the transmission screen are accepted (step S1205). When a transmission start button 904 on the transmission screen of FIG. 9 is depressed, the transmission of the selected document is started (step S1206). Since execution of enforced equipment signature is set, an equipment signature is added to the document to be transmitted by utilizing a secret key 1601 unique to the MFP 105 and a public key certificate 1602, which are shown in FIG. 16 and saved in the hard disk unit 306 of the MFP 105 (step S1207). Then, the data transmission process of FIG. 12 is completed.

Figure 14:
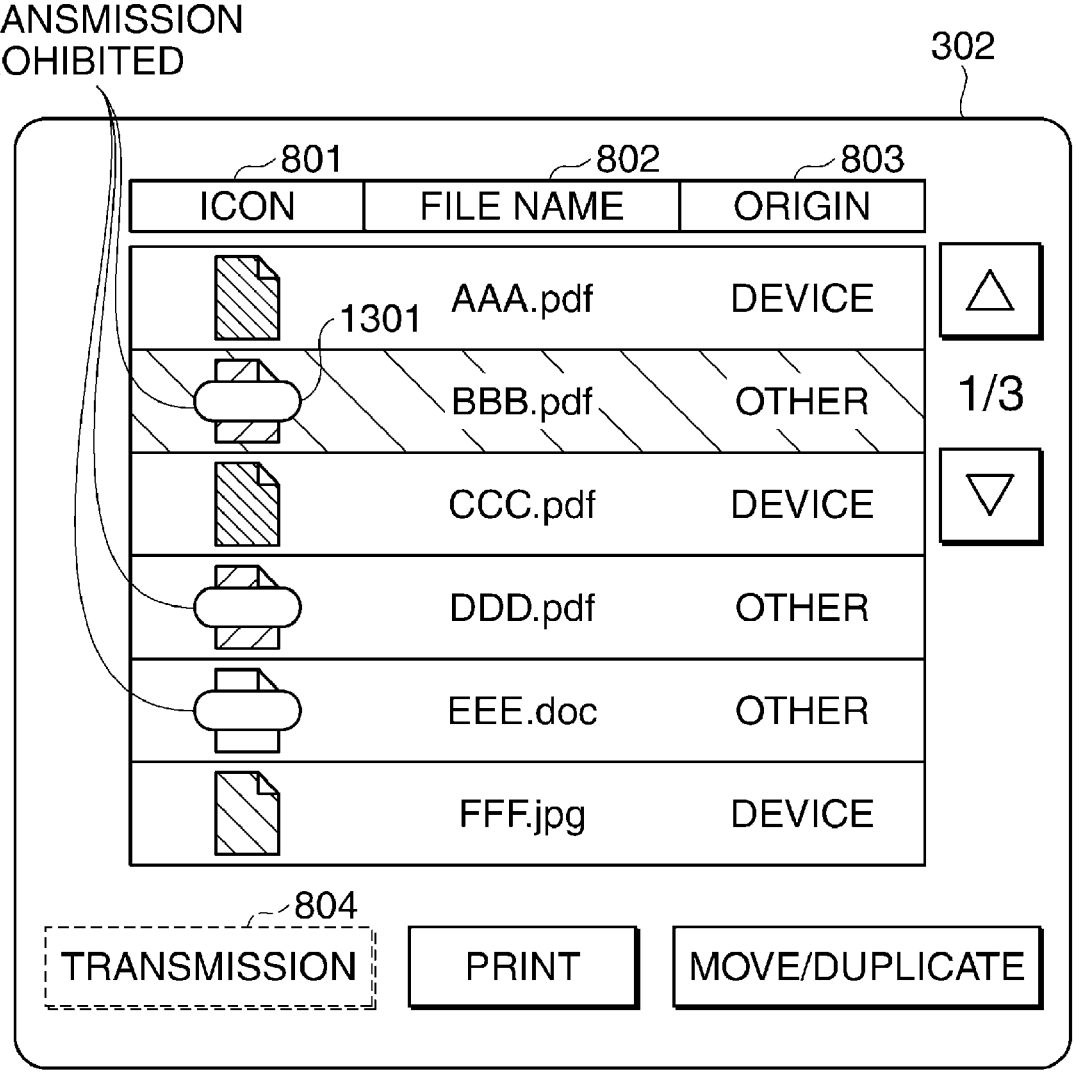
FIG. 14 is a view showing another example selection screen displayed on the operation unit in step S1202.

On the other hand, if it is determined in step S1204 that the selected document is one not created by the MPP 105 (NO to step S1204), transmission of the selected document (transmission function) is prohibited or restricted. For example, the transmission button 804 is grayed out as shown in FIG. 14, whereby the transmission button is disabled (step S1208). Then, the data transmission process of FIG. 12 is completed. It should be noted that when the answer to step S1204 becomes NO, the process may proceed to step S1202 for re-selection of document, instead of prohibiting the transmission of the document in step S2108.

With the data transmission process in FIG. 12, when the execution of enforced equipment signature is set to the MFP 105, transmission of a document not created by the MFP 105 is prohibited. It is therefore possible to prevent the equipment signature from being added to a document other than a document created by the MFP 105, thereby improving the security.

Figure 15:
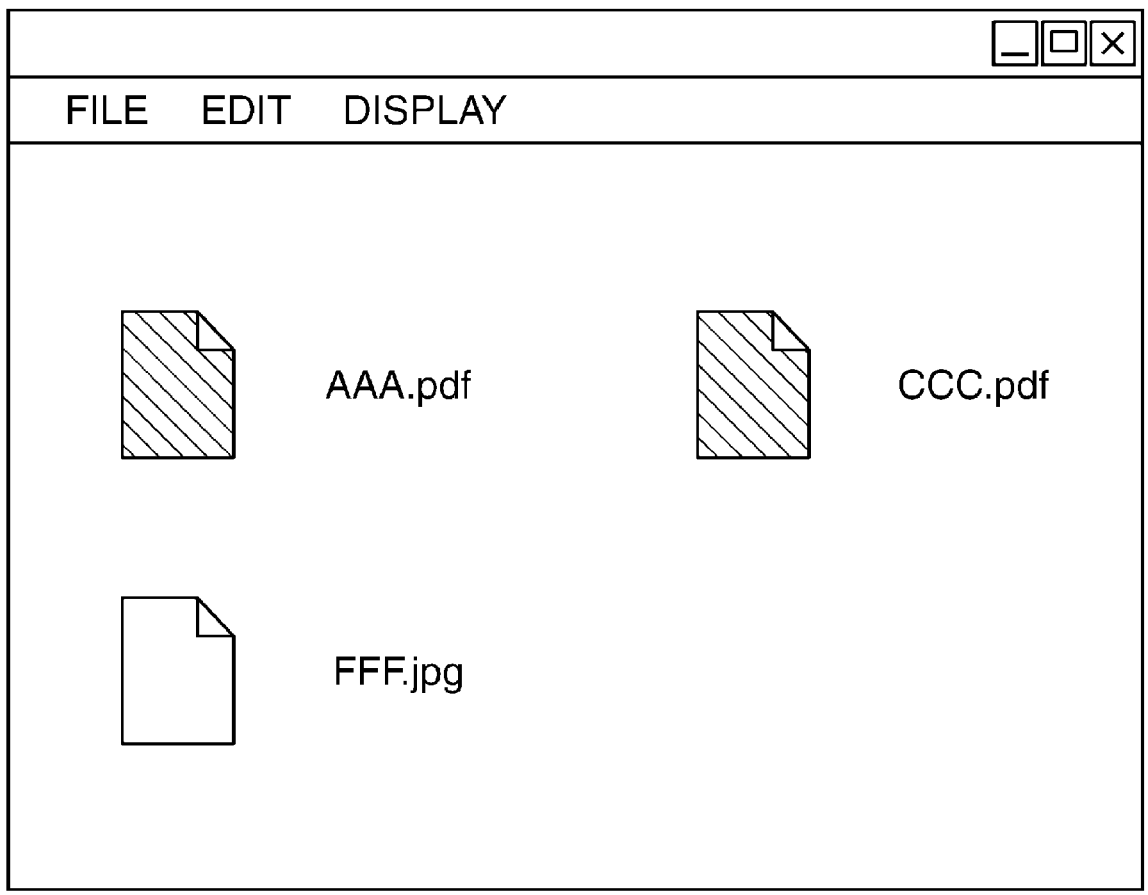
FIG. 15 is a view showing an example document display screen displayed on each of the client PCs in FIG. 2.

In the above described embodiments, in a case that the client PC 103 or 104 is adapted to display documents (electronic data) saved in the hard disk unit 306 of the MFP 105, the client PC may not display documents (refer to FIG. 15) corresponding to those documents for which transmission prohibition icons 1301 are displayed on the selection screen of FIG. 13. This makes it possible to prevent the client PCs 103, 104 from acquiring documents whose transmission is prohibited, whereby the security can be improved.

It is to be understood that the present invention may also be accomplished by supplying a system or an apparatus with a storage medium in which a program code of software, which realizes the functions of the above described embodiments is stored and by causing a computer (or CPU or MPU) of the system or apparatus to read out and execute the program code stored in the storage medium. In that case, the program code itself read from the storage medium realizes the functions of the above described embodiments, and therefore the program code and the storage medium in which the program code is stored constitute the present invention.

Examples of the storage medium for supplying the program code include a floppy (registered trademark) disk, a hard disk, and a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-204573, filed Aug. 7, 2008, which is hereby incorporated by reference herein in its entirety.

What is claimed is:

1. An image processing apparatus having a creation unit adapted to read an original and create electronic data, the image processing apparatus comprising:

a storage unit adapted to store electronic data created by the creation unit and electronic data created by an external unit, said storage unit being adapted to store electronic data created by the creation unit in association with identification information representing the image processing apparatus;

a first determination unit adapted to determine electronic data created by said creation unit based on the identification information among electronic data stored in said storage unit, wherein in a case where the identification information representing the image processing apparatus is embedded in electronic data created by said creation unit, said first determination unit makes determination based on the identification information embedded therein;

a second determination unit adapted to determine whether the identification information embedded in the electronic data created by said creation unit is valid; and a restriction unit adapted to, based on a result of determination by said first determination unit, restrict execution of a function of the image processing apparatus on electronic data created by the external unit among electronic data stored in said storage unit.

2. The image processing apparatus according to claim 1, wherein the identification information embedded in the electronic data created by said creation unit is an electronic signature unique to the image processing apparatus.

3. An image processing apparatus having a creation unit adapted to read an original and create electronic data, the image processing apparatus comprising:
   a storage unit adapted to store electronic data created by the creation unit and electronic data created by an external unit, said storage unit being adapted to store electronic data created by the creation unit in association with identification information representing the image processing apparatus;
   a determination unit adapted to determine electronic data created by said creation unit based on the identification information among electronic data stored in said storage unit; and
   a restriction unit adapted to, based on a result of determination by said determination unit, restrict execution of a function of the image processing apparatus on electronic data created by the external unit among electronic data stored in said storage unit,
   wherein said restriction unit is adapted to restrict a function of adding an electronic signature unique to the image processing apparatus to electronic data created by the external unit.

4. An image processing apparatus having a creation unit adapted to read an original and create electronic data, the image processing apparatus comprising:
   a storage unit adapted to store electronic data created by the creation unit and electronic data created by an external unit, said storage unit being adapted to store electronic data created by the creation unit in association with identification information representing the image processing apparatus;
   a determination unit adapted to determine electronic data created by said creation unit based on the identification information among electronic data stored in said storage unit; and
   a restriction unit adapted to, based on a result of determination by said determination unit, restrict execution of a function of the image processing apparatus on electronic data created by the external unit among electronic data stored in said storage unit,
   wherein said restriction unit is adapted to restrict execution of a conversion function on electronic data created by the external unit, the conversion function including execution of image processing by the image processing apparatus.

5. An image processing apparatus having a creation unit adapted to read an original and create electronic data, the image processing apparatus comprising:
   a storage unit adapted to store electronic data created by the creation unit and electronic data created by an external unit, said storage unit being adapted to store electronic data created by the creation unit in association with identification information representing the image processing apparatus;
   a determination unit adapted to determine electronic data created by said creation unit based on the identification information among electronic data stored in said storage unit; and
   a restriction unit adapted to, based on a result of determination by said determination unit, restrict execution of a function of the image processing apparatus on electronic data created by the external unit among electronic data stored in said storage unit,
   wherein in a case where the image processing apparatus is adapted to add an electronic signature unique to the image processing apparatus to electronic data stored in said storage unit when the electronic data is transmitted to outside, said restriction unit is adapted to restrict execution of a transmission function of the image processing apparatus on electronic data created by the external unit.

6. An image processing method for an image processing apparatus having a creation unit adapted to read an original and create electronic data, the image processing method comprising:
   a storage step of storing electronic data created by the creation unit in a storage unit in association with identification information representing the image processing apparatus, the storage unit being adapted to store electronic data created by the creation unit and electronic data created by an external unit;
   a first determination step of determining electronic data created by the creation unit based on the identification information among electronic data stored in the storage unit in said storage step,
   wherein in a case where the identification information representing the image processing apparatus is embedded in electronic data created by the creation unit, said first determination step makes determination based on the identification information embedded therein;
   a second determination step of determining whether the identification information embedded in the electronic data created by the creation unit is valid; and
   a restriction step of restricting, based on a result in said determination step, execution of a function of the image processing apparatus on electronic data created by the external unit among electronic data stored in the storage unit in said storage step.

7. A non-transitory computer-readable medium storing a program executable by a computer to execute an image processing method for an image processing apparatus having a creation unit adapted to read an original and create electronic data, the image processing method comprising:
   a storage step of storing electronic data created by the creation unit in a storage unit in association with identification information representing the image processing apparatus, the storage unit being adapted to store electronic data created by the creation unit and electronic data created by an external unit;
   a first determination step of determining electronic data created by the creation unit based on the identification information among electronic data stored in the storage unit in said storage step,
   wherein in a case where the identification information representing the image processing apparatus is embedded in electronic data created by the creation unit, said first determination step makes determination based on the identification information embedded therein;

a second determination step of determining whether the identification information embedded in the electronic data created by the creation unit is valid; and a restriction step of restricting, based on a result in said determination step, execution of a function of the image processing apparatus on electronic data created by the external unit among electronic data stored in the storage unit in said storage step.

8. The image processing apparatus according to claim 3, wherein the identification information embedded in the electronic data created by said creation unit is an electronic signature unique to the image processing apparatus.

9. The image processing apparatus according to claim 4, wherein the identification information embedded in the electronic data created by said creation unit is an electronic signature unique to the image processing apparatus.

10. The image processing apparatus according to claim 5, wherein the identification information embedded in the electronic data created by said creation unit is an electronic signature unique to the image processing apparatus.

11. The image processing apparatus according to claim 4, wherein the conversion function includes executing a character recognition (OCR) or a high compression.

12. An image processing method for an image processing apparatus having a creation unit adapted to read an original and create electronic data, the image processing method comprising:

a storage step of storing electronic data created by the creation unit in a storage unit in association with identification information representing the image processing apparatus, the storage unit being adapted to store electronic data created by the creation unit and electronic data created by an external unit;

a determination step of determining electronic data created by the creation unit based on the identification information among electronic data stored in the storage unit in said storage step; and a restriction step of restricting, based on a result in said determination step, execution of a function of the image processing apparatus on electronic data created by the external unit among electronic data stored in the storage unit in said storage step, wherein said restriction step restricts a function of adding an electronic signature unique to the image processing apparatus to electronic data created by the external unit.

13. An image processing method for an image processing apparatus having a creation unit adapted to read an original and create electronic data, the image processing method comprising:

a storage step of storing electronic data created by the creation unit in a storage unit in association with identification information representing the image processing apparatus, the storage unit being adapted to store electronic data created by the creation unit and electronic data created by an external unit;

a determination step of determining electronic data created by the creation unit based on the identification information among electronic data stored in the storage unit in said storage step; and a restriction step of restricting, based on a result in said determination step, execution of a function of the image processing apparatus on electronic data created by the external unit among electronic data stored in the storage unit in said storage step, wherein said restriction step restricts execution of a conversion function on electronic data created by the external unit, the conversion function including execution of image processing by the image processing apparatus.

14. An image processing method for an image processing apparatus having a creation unit adapted to read an original and create electronic data, the image processing method comprising:

a storage step of storing electronic data created by the creation unit in a storage unit in association with identification information representing the image processing apparatus, the storage unit being adapted to store electronic data created by the creation unit and electronic data created by an external unit;

a determination step of determining electronic data created by the creation unit based on the identification information among electronic data stored in the storage unit in said storage step; and a restriction step of restricting, based on a result in said determination step, execution of a function of the image processing apparatus on electronic data created by the external unit among electronic data stored in the storage unit in said storage step, wherein in a case where the image processing apparatus is adapted to add an electronic signature unique to the image processing apparatus to electronic data stored in the storage unit in said storage step when the electronic data is transmitted to outside, said restriction step restricts execution of a transmission function of the image processing apparatus on electronic data created by the external unit.

15. A non-transitory computer-readable medium storing a program executable by a computer to execute an image processing method for an image processing apparatus having a creation unit adapted to read an original and create electronic data, the image processing method comprising:

a storage step of storing electronic data created by the creation unit in a storage unit in association with identification information representing the image processing apparatus, the storage unit being adapted to store electronic data created by the creation unit and electronic data created by an external unit;

a determination step of determining electronic data created by the creation unit based on the identification information among electronic data stored in the storage unit in said storage step; and a restriction step of restricting, based on a result in said determination step, execution of a function of the image processing apparatus on electronic data created by the external unit among electronic data stored in the storage unit in said storage step, wherein said restriction step restricts a function of adding an electronic signature unique to the image processing apparatus to electronic data created by the external unit.

16. A non-transitory computer-readable medium storing a program executable by a computer to execute an image processing method for an image processing apparatus having a creation unit adapted to read an original and create electronic data, the image processing method comprising:

a storage step of storing electronic data created by the creation unit in a storage unit in association with identification information representing the image processing apparatus, the storage unit being adapted to store electronic data created by the creation unit and electronic data created by an external unit;

a determination step of determining electronic data created by the creation unit based on the identification information among electronic data stored in the storage unit in said storage step; and a restriction step of restricting, based on a result in said determination step, execution of a function of the image processing apparatus on electronic data created by the external unit among electronic data stored in the storage unit in said storage step, wherein said restriction step restricts execution of a conversion function on electronic data created by the external unit, the conversion function including execution of image processing by the image processing apparatus.

17. A non-transitory computer-readable medium storing a program executable by a computer to execute an image processing method for an image processing apparatus having a creation unit adapted to read an original and create electronic data, the image processing method comprising:

a storage step of storing electronic data created by the creation unit in a storage unit in association with identification information representing the image processing apparatus, the storage unit being adapted to store electronic data created by the creation unit and electronic data created by an external unit;

a determination step of determining electronic data created by the creation unit based on the identification information among electronic data stored in the storage unit in said storage step; and a restriction step of restricting, based on a result in said determination step, execution of a function of the image processing apparatus on electronic data created by the external unit among electronic data stored in the storage unit in said storage step, wherein in a case where the image processing apparatus is adapted to add an electronic signature unique to the image processing apparatus to electronic data stored in the storage unit in said storage step when the electronic data is transmitted to outside, said restriction step restricts execution of a transmission function of the image processing apparatus on electronic data created by the external unit.

* * * * *